Patented Mar. 20, 1951

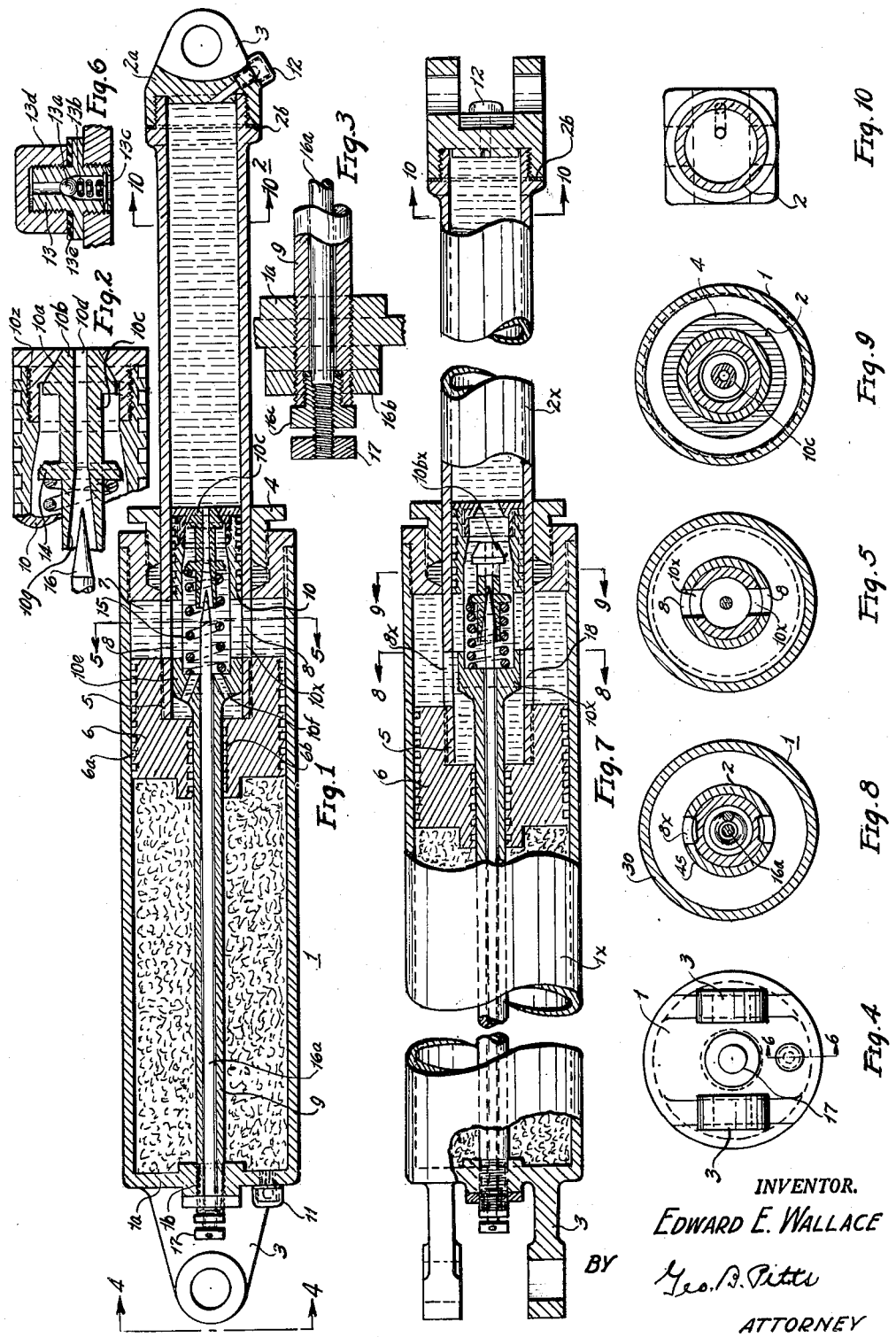

2,545,833

UNITED STATES PATENT OFFICE 2,545,833

SHOCK ABSORBER

Edward E. Wallace, Cleveland Heights, Ohio; Daisy T. Wallace administratrix of said Edward E. Wallace, deceased Application August 13, 1947, Serial No. 768,455

7 Claims. (Cl. 267—64)

This invention relates to shock absorbers adapted to reduce or prevent quick and undue vibrations to the frames or structural units of transportation apparatus, whereby the passengers carried thereby are relieved of physical strains and jolts and danger of damage to the frames and/or freight carried thereby and structural units and other parts of the apparatus is materially reduced or avoided.

The shock absorber, as herein disclosed, may form part of a mounting for the surface engaging member (such as a wheel) for a vehicle, for example, part of the landing gear of an airplane or to resist lateral thrusts on the gear during landing of the airplane, but it will be obvious that the invention is not to be limited in its application to an airplane and that one or more shock absorbers may be employed accordingly as the construction of any specific apparatus may require, and whether the frame is suspended wholly or partially by springs and/or rubber.

One object of the invention is to provide an improved shock absorber capable of supporting the weight of the frame of an apparatus and having a combined cushioning and return retarding means to reduce vibrations due to shock and jolts, during operation of the apparatus.

Another object of the invention is to provide an improved shock absorber, wherein the employment of springs and/or rubber are eliminated.

A further object of the invention is to provide a shock absorber of simple construction embodying certain improvements in the form of construction disclosed in my application Ser. No. 431,102, filed February 16, 1942, now Patent Number 2,415,615.

Another object of the invention is to provide an improved shock absorber consisting of relatively movable cylinders and a piston connected to each cylinder and fitting the wall of the other cylinder, to form therein a sealed chamber, one cylinder being filled with a compressible fluid under pressure and the other cylinder being filled with a non-compressible fluid under pressure and means provided in one piston for controlling the flow of the non-compressible fluid from and to the cylinder therefor during relative movements of the cylinders.

Other objects of the invention will be apparent to those skilled in the art to which my invention relates from the following description taken in connection with the accompanying drawing, wherein Fig. 1 is a sectional view of a shock absorber embodying my invention.

Figs. 2 and 3 are fragmentary sections of parts shown in Fig. 1, enlarged.

Fig. 4 is a view on the line 4—4 of Fig. 1.

Fig. 5 is a section on the line 5—5 of Fig. 1.

Fig. 6 is a fragmentary section on the line 6—6 of Fig. 4, enlarged.

Fig. 7 is a sectional view of a shock absorber showing a modified embodiment of the invention.

Figs. 8, 9 and 10 are sections on the lines 8—8, 9—9 and 10—10, respectively, of Figs. 1 and 7.

In the drawing, 1, 2, indicate telescopically related hollow cylinders closed at their outer ends by walls 1a, 2a, respectively. Each wall 1a, 2a, is provided with projecting elements 3 for connection to the structural parts of the apparatus to be relieved of stresses during operation thereof. To permit of assembly of certain parts of the shock absorber, hereinafter referred to, the end wall 2a consists of a cap threaded on the adjacent end of the cylinder 2 and sealed relative thereto by a gasket 2b. The inner end of the cylinder 1 is internally provided with screw threads to receive and support the outer member of a suitable gland 4 which sealingly closes the space between the cylinders 1, 2, while permitting telescopic or relative movement therebetween. The cylinder 2 extends through the gland 4 into the cylinder 1, its inner end portion being externally provided with screw threads and engages the inner threaded wall of a recess 5 formed in a piston 6 which slidably fits the walls of the cylinder 1. The piston 6 is provided with suitable rings 6a to provide a sealed relation with the inner wall of the cylinder 1. The cylinder 1, between its end wall 1a and the piston 6, is filled with a suitable gas—preferably air—under an initial pressure dependent on the overall weight of the apparatus or parts to which the cylinders are connected and its normal carry capacity. As will be observed, the air is adapted to be compressed when the cylinders 1, 2, move relatively, one toward the other, and hence yieldingly resists relative movement of the cylinders 1, 2. In normal position of the cylinders 1, 2, the piston 6 is spaced from the gland 4 to form a chamber 7 for a purpose later set forth and throughout this space the cylinder 2 is formed with an opening 8 communicating with the chamber 7. I preferably provide two openings 8, in diametrical relation (see Fig. 5), in the wall of the cylinder 2. 9 indicates a tubular member extending axially of the cylinder 1. The outer end portion of the member 9 extends through an opening 1b formed in the end wall 1a, the member 9 being externally threaded and having threaded connection with the wall of the opening 1b to secure the member in fixed relation to the cylinder 1. The tubular member 9 extends through an opening 6b formed in the piston 6, and inwardly of the latter the member 9 is provided with a hollow piston 10, which slidably fits the wall of the cylinder 2. The screw thread connection between the member 9 and end wall 1a permits the piston 10 to be adjusted relative to the cylinder 1 or piston 6 when found desirable. The cylinder 2, between the piston 10 and end wall 2a is filled with a substantially non-compressible fluid, such as oil, under pressure equal to the initial pressure of the air in the cylinder 1, so that the pressure of each medium counterbalances that of the other medium when the cylinders 1, 2, are in normal or extended position, as shown in Fig. 1. The wall of the opening 6b is provided with suitable piston rings to prevent escape of the air in the cylinder 1 and leakage of the oil from the cylinder 2 into the cylinder 1. The cylinders 1, 2, are charged with air and oil, respectively, through suitable valves 11, 12, which are preferably similar in construction, one thereof being shown in Fig. 6 and consisting of the following: 13 indicates a nipple through which the adjacent cylinder is charged with fluid (air or oil). The inner end of the nipple is screw threaded into an opening formed in the cylinder wall—side wall or end wall thereof—and the bore through the nipple 13 is shaped to form a seat for a valve 13a, to prevent outflow of the medium. The valve 13a is yieldingly held in engagement with its seat by a spring 13b, supported on a cross pin 13c. The outer end of the nipple 13 is externally threaded to receive a removable cap 13d, which may be tightened against a suitable gasket 13e. The opposite side walls of the piston 10 are formed with openings 10x, in registry with the openings 8 in the wall of the cylinder 2, to provide a connection between the interior of the piston 10 and the chamber 7. The outer end wall of the piston 10 is formed with an axially disposed opening 10a forming a valve seat for a valve element 10b. The valve element 10b is provided integrally with an inwardly extending shank 10c, the valve element 10b and shank 10c being formed with a relatively small through opening 10d to permit oil flow therethrough, in the manner later set forth. When the cylinder 2 is initially charged with oil, the latter flows through the opening 10d to fill the piston 10 and chamber 7. The valve shank 10c is provided intermediate its ends with a collar 14, which forms the seat for one end of a coiled spring 15, the opposite end of the spring being seated against the inner end wall 10e of the piston 10; as will be observed, the spring 15 is under compression and tends to maintain the valve element 10b in engagement with its seat 10a. By preference, the outer end wall of the piston 10 consists of a cap 10z having a skirt threadedly engaging the inner wall of piston 10, and between the cap 10z and the openings 10x the inner wall of the piston is shaped to accommodate the collar 14 and co-act therewith to guide the shank 10c endwise during opening and closing movements of the valve. The inner end wall 10e of the piston 10 is formed with a plurality of through ports 10f through which the oil flows during the relative expanding movement of the cylinders 1, 2 as later set forth.

It will be observed that when the cylinders 1, 2, are subjected to a force which effects a relative inward or retracting movement thereof (that is, one cylinder moves toward the end wall of the other cylinder or both simultaneously move in these directions), the air in the cylinder 1 is compressed by the piston 6, the increased pressure on the oil in cylinder 2 forces the valve 10b open and oil flows through the opening 10a into the piston 10, the piston 6 and gland 4 are separated and effect an enlargement of the chamber 7 for the oil forced through the valve opening 10a, the piston 6 and inner end wall 10e of the piston are separated to form an enlarged auxiliary chamber between them, and the openings 8 are connected with auxiliary chamber below the inner end wall 10e of the piston 10, so that the oil in the chamber 7 flows into the auxiliary chamber. To control the return flow of the oil to the cylinder 2 in the reverse relative or expanding movement of the cylinders, I provide an oil flow restricting means, which may be adjusted externally of the cylinders, at the inner end of the valve element shank 10c. As the valve 10b is closed by the pressure on the oil immediately the cylinders move in the expanding direction, and the return flow of the oil must be through the opening 10d, the restricting means is disposed in the path of the oil as it flows to the cylinder 2. As shown, the wall at the inner end portion of the opening 10d in the shank 10c is conically shaped, as shown at 10g and surrounds a similarly shaped member 16 forming the inner end of a rod 16a slidably fitting and extending through the tubular member 9. The outer end portion of the rod 16a has screw threaded engagement with the inner wall of the tubular member 9, so that by turning the rod 16a, by means of a device 17 fixed to its outer end, the rod 16a is moved endwise, the effect of which is to adjust the area of the flow space between member 16 and conical wall 10g, thereby increasing or decreasing the rate of flow of the oil through the opening 10d into the cylinder 2. By preference, the adjustable connection of the rod 16a with the head 1a is constructed to prevent escape of oil from the tubular member 9. Accordingly, I provide a gland 16b which is engaged by a hollow nut 16c and threaded into the member 9. The inner wall of the nut 16c is provided with screw threads, which are engaged by the threads on the outer end portion of the rod 16a, as shown in Fig. 3.

In the initial expanding movement of the cylinders a portion of the oil in the auxiliary chamber is forced through the openings 10f and a portion thereof is forced into the chamber 7 until the openings 8 move past the piston end wall 10e; in the continued relative movement of the cylinder 1, 2, the remaining oil in the auxiliary chamber is forced through the openings 10f into the piston and the excess oil in the piston 10 and chamber 7 is forced through the restricting means into the cylinder 2, to retard the expanding movement of the cylinders.

Fig. 7 shows a slightly modified form of construction, the cylinders indicated at 1x, 2x, being shown in their retracted position with the valve 10b× open. The parts shown in Fig. 7 are similar in construction to like parts shown in Figs. 1 to 6, except that openings through the inner end wall of the piston 10x in the cylinder 2x are smitted and flow of the oil from the auxiliary chamber into the piston 10x, when the cylinders 1x, 2x, are expanding to normal position, is through channels 18 formed in the side walls of the inner end wall, preferably in alinement with the openings 8x formed in the wall of the cylinder 2x.

To those skilled in the art to which my invention relates many changes in construction and widely differing embodiments and applications of the invention will suggest themselves without departing from the spirit and scope of the invention. My disclosures and the description herein are purely illustrative and are not intended to be in any sense limiting.

What I claim is:

1. In a shock absorber, the combination of a hollow cylinder, a piston reciprocatable therein, said cylinder between the outer end wall and said piston being filled with air under pressure, a separate hollow cylinder extending into said first mentioned cylinder and connected to said piston, sealing means between the inner end of said first mentioned cylinder and said separate cylinder, a separate hollow piston in said separate cylinder and provided at its outer end with a normally closed valve, a rigid member extending through said first mentioned piston for securing said separate piston in fixed relation to said first mentioned cylinder, said separate cylinder being filled with fluid under pressure, said valve being operable to control the flow of fluid from said separate cylinder into said separate piston and said first mentioned cylinder between said first mentioned piston and said sealing means, the valve element of said valve being formed with a through opening, and a device extending into the inner end of said opening to restrict the return flow of the fluid therethrough to said separate cylinder.

2. A shock absorber as claimed in claim 1 wherein said device extends through said first mentioned cylinder and is adjustably connected at its outer end to the end wall of said cylinder.

3. In a shock absorber, the combination of a hollow cylinder, a piston reciprocatable therein, said cylinder between its outer end wall and said piston being filled with air under pressure, a separate hollow cylinder extending into said first mentioned cylinder and connected to said piston, sealing means between the inner end of said first mentioned cylinder and said separate cylinder, a separate hollow piston reciprocatable in said separate cylinder, said separate cylinder being filled with fluid under pressure, a tubular member connecting said separate piston to the end wall of said first mentioned cylinder, a valve in the end wall of said separate piston arranged to control the flow of fluid from said separate cylinder into said hollow piston and said first mentioned cylinder between said first mentioned piston and said sealing means, the valve element of said valve being formed with a through opening, and a rod adjustably connected at its outer end to the end wall of said first mentioned cylinder and extending through said tubular member, the inner end of said rod extending into said opening and co-acting with the wall thereof to restrict the return flow of fluid therethrough to said separate cylinder.

4. In a shock absorber, the combination of a hollow cylinder, a separate hollow cylinder extending into said first mentioned cylinder, sealing means between the inner end of said first mentioned cylinder and said separate cylinder, a piston reciprocatable in said first mentioned cylinder, connected to the inner end of said separate cylinder and spaced from said sealing means to form a liquid receiving space, the wall of said separate cylinder being formed with an opening communicating with said space, the inner end of said piston being formed with a recess, a hollow piston having outer and inner end walls reciprocatable in said separate cylinder and connected to said first mentioned cylinder, said first mentioned cylinder between its end wall and said first mentioned piston being filled with air under pressure and said separate cylinder being filled with fluid under pressure, the inner end wall of said hollow piston being formed with ports leading into said recess, a valve in the outer end wall of said separate piston arranged to control the flow of fluid from said separate cylinder into said hollow piston and said space and through said ports into said recess, the valve element of said valve being formed with a through opening to initially supply fluid from said separate cylinder to said hollow piston, said space and said recess, and a device connected at its outer end to the end wall of said first mentioned cylinder and extending through said first mentioned piston and into said hollow piston, the inner end of said device extending into said opening and related to the walls thereof for restricting the return flow of fluid to said separate cylinder.

5. In a shock absorber, the combination of a hollow cylinder, a separate cylinder extending into said first mentioned cylinder, means adjacent the open end of said first mentioned cylinder, for closing the space between said cylinders, a piston reciprocatable in said first mentioned cylinder, connected to the inner end of said separate cylinder and forming with said closing means a chamber for fluid, a hollow piston in said separate cylinder inwardly of said first mentioned piston, means extending through said first mentioned piston for connecting said hollow piston to said first mentionel cylinder, whereby said pistons during movement of said separate cylinder inwardly of said first mentioned cylinder form an auxilitary chamber between them to receive fluid from said first mentioned chamber, said first mentioned cylinder being filled with air under pressure and said separate cylinder being filled with fluid under pressure, said hollow piston having outer and inner end walls, the side walls of said hollow piston and said separate cylinder being formed with openings communicating with said first mentioned chamber when the cylinders are in normal position and the inner end wall of said hollow piston being formed with a port through which fluid flows from the auxiliary chamber into said hollow piston, a valve in the outer end wall of said hollow piston to control the flow of fluid from said separate cylinder into said hollow piston, the valve element of said valve being formed with a through opening to initially supply fluid from said separate cylinder to said hollow piston and said first mentioned chamber, and means related to the inner end of said last mentioned opening to restrict the return flow of fluid therethrough to said separate cylinder.

6. In a shock absorber, the combination of a hollow cylinder, a separate cylinder extending into said first mentioned cylinder, means adjacent the open end of said first mentioned cylinder for closing the space between said cylinders, a piston reciprocatable in said first mentioned cylinder, connected to and closing the inner end of said separate cylinder and forming with said closing means a chamber for fluid, a hollow piston in said separate cylinder inwardly of said first mentioned piston, means extending through said first mentioned piston for connecting said hollow piston in fixed relation to said first mentioned cylinder, the movement of either piston in the adjacent cylinder toward the end wall of the latter being arranged to form an auxiliary chamber between said hollow piston and the closed end of said separate cylinder to receive fluid from said first mentioned chamber, said first mentioned cylinder being filled with air under pressure and said separate cylinder being filled with fluid under pressure, said hollow piston having outer and inner end walls, the side walls of said hollow piston and said separate cylinder being formed with openings communicating with said first mentioned chamber when said cylinders are in normal position and the inner end wall of said hollow piston being formed with an oil flow connection through which fluid flows from the auxiliary chamber into said hollow piston, a valve in the outer end wall of said hollow piston to control the flow of fluid from said separate cylinder into said hollow piston, the valve element of said valve being formed with a through opening to initially supply fluid from said separate cylinder to said hollow piston and said first mentioned chamber, and means related to the inner end of said last mentioned opening to restrict the return flow of fluid therethrough to said separate cylinder.

7. A shock absorber as claimed in claim 6 wherein the flow connection formed in the inner end wall of said hollow piston consists of a channel extending along the side of said wall.

EDWARD E. WALLACE.

REFERENCES CITED

The following references are of record in the file of this patent:

UNITED STATES PATENTS

| Number | Name | Date |
|---|---|---|
| 1,219,035 | Pettengill | Mar. 13, 1917 |
| 1,616,540 | Morgan | Feb. 8, 1927 |
| 2,213,823 | Renfer | Sept. 3, 1940 |
| 2,275,462 | Parilla | Mar. 10, 1942 |
| 2,363,125 | Foster | Nov. 21, 1944 |

FOREIGN PATENTS

| Number | Country | Date |
|---|---|---|
| 741,291 | France | Dec. 3, 1932 |
| 777,611 | France | Dec. 5, 1934 |
| 45,059 | France | Mar. 11, 1935 |